United States Patent

[11] 3,634,063

[72] Inventor Paul Y. Hwang
Palo Alto, Calif.
[21] Appl. No. 31,375
[22] Filed Apr. 23, 1970
[45] Patented Jan. 11, 1972
[73] Assignee Ampex Corporation
Redwood City, Calif.

[54] ACICULAR, STABLE MAGNETIC IRON PARTICLES
2 Claims, No Drawings

[52] U.S. Cl. .......... 75/0.5 AA, 75/0.5 BA, 148/105
[51] Int. Cl. .......... B22f 9/00
[50] Field of Search .......... 75/0.5 AA, 0.5 BA; 148/100, 104, 105, 31.55

[56] References Cited

UNITED STATES PATENTS

| | | | |
|---|---|---|---|
| 3,206,338 | 9/1965 | Miller et al. .......... | 75/0.5 AA |
| 3,520,676 | 7/1970 | Stahr .......... | 75/0.5 AA |
| 3,535,104 | 10/1970 | Little, Jr. et al. .......... | 148/105 |

*Primary Examiner*—L. Dewayne Rutledge
*Assistant Examiner*—G. K. White
*Attorney*—Robert G. Clay

ABSTRACT: Stable acicular iron particles are made by reducing an acicular ferric oxide to iron at a relatively low temperature. The reduced iron particles are rendered nonpyrophoric by treatment with ammonium hydroxide.

ACICULAR, STABLE MAGNETIC IRON PARTICLES

SUMMARY OF THE INVENTION

The magnetic particles used in making magnetic recording elements, such as magnetic tapes, generally consist of acicular gamma ferric oxide. It has been long recognized that iron itself would be superior to gamma ferric oxide with respect to signal-to-noise ratio, magnetic moment and coercive force. However, iron itself suffers from the difficulty that iron particles in the submicron range ordinarily used in making magnetic tapes are pyrophoric. This deficiency of iron has prevented any substantial use of iron in making magnetic recording elements despite the recognized advantages of pure iron. Larger particles are nonpyrophoric but they have poor magnetic properties.

The object of the present invention is to produce an iron powder of high coercivity for improved short wavelength response; high magnetic moment for high output, small particle size for improved signal-to-noise ratio and good chemical stability for safe handing and long storage.

The actual reduction of the iron oxide particles does not form a part of the present invention but it generally can be said that the starting materials can be either red or yellow acicular ferric oxide or acicular magnetite and these are reduced to metallic iron in a stream of hydrogen gas. Preferably this is conducted at a relatively low temperature to prevent sintering and to preserve the particle shape. Normally the temperature must not be over 450° C. and preferably is not over 350° C. In accordance with another copending patent application and owned by the same assignee, improved acicularity is obtained by first doping the iron oxide with a small amount of bismuth prior to the reduction. The present invention is applicable to such particles.

The objects of the present invention are achieved by discharging the reduction iron particles directly from the reduction furnace into an aqueous solution of ammonium hydroxide. This can be done while the particles are still hot or they can be cooled to room temperature, or some intermediate temperature before discharge. The samples are discharged into $NH_4OH$ solution by submerging the discharge end of the reactor into the $NH_4OH$ solution. The strength of the solution is not particularly critical and strength variations from 1 N to 20 N have been found suitable. It is not necessary to let the particles soak in the ammonium hydroxide solution for any length of time and immediately after being introduced into the ammonium hydroxide solution, the particles can be filtered out of the solution, washed with a solvent and dried at room temperature. Suitable solvents include low boiling point alcohols such as ethanol and methanol, methylethyl ketone (MEK), formaldehyde and ethers.

DESCRIPTION OF THE PREFERRED EMBODIMENTS

The following nonlimiting examples illustrate various preferred embodiments of the present invention:

EXAMPLE 1

Alpha ferric oxide monohydrate ($\alpha -Fe_2O_3 \cdot H_2O$) with an average particle size of 1.0 micron × 0.15 micron is dehydrated to alpha ferric oxide ($\alpha - Fe_2O_3$) in an electric furnace at 350° C. for 1 hour. Half a gram of the alpha ferric oxide powder is placed in a porcelain combustion boat. The boat and the content are placed inside a combustion tube. Hydrogen gas is introduced into the tube at a rate of 2 SCFH. After the tube is purged with hydrogen gas for 10 minutes, it is heated in an electrically heated tube furnace at a selected temperature for 2 hours. The product was then cooled to about 50° C. and discharged directly into a 250 ml. beaker containing 100 ml. of 5 N $NH_4OH$ solution. The product is then filtered, washed with MEK and dried at room temperature. The samples have the following properties:

| Sample | Temp. | % Fe | Coercivity | Saturation Moment | Squareness Ratio |
|---|---|---|---|---|---|
| A | 325° C. | 92.6 | 375 Oe | 172 emu/g. | 0.238 |
| B | 350° C. | 92.0 | 400 Oe | 165 emu/g. | 0.231 |
| C | 400° C. | 92.1 | 290 Oe | 175 emu/g. | 0.167 |

They are nonpyrophoric up to 150° C.

EXAMPLE 2

The starting material and experimental procedures are the same as in example 1, except that the sample is reduced for 6 hours with hydrogen gas at 250° C. prior to discharging into a 1 N $NH_4OH$ solution. Properties of this sample are as follows:

| Sample | % Fe | Coercivity | Saturation moment | Squareness Ratio |
|---|---|---|---|---|
| D | 90.5 | 630 Oe | 149 emu/g. | 0.362 |

It is also nonpyrophoric up to 150° C.

The fast reduction rates of samples A and B cause rapid nucleation and change the acicular oxide particles to chains of spheres. The particles of sample C appear to be slightly sintered. The particles of Sample D retain the acicular shape of the starting material but the average particle size becomes smaller (0.6 micron × 0.15 micron). Sample D is an excellent material for magnetic recording application although all of the samples may be used for this purpose.

EXAMPLE 3

Fifty grams of mannitol are dissolved in 500 ml. of water. Eighty-one grams of $Bi(NO_3)_3 \cdot b5H_2O$ are dissolved in this solution, with the mannitol acting as a chelating agent to hold the bismuth in solution. Eighty milliliters of this solution is mixed with 150 grams of red alpha iron oxide. The wet oxide is dried at 110° C. The weight ratio of bismuth to iron in this oxide is 0.05.

The dry powder is placed in a rotary kiln of about 1 quart capacity. The sample is heated to 320° C. in a stream of hydrogen gas, and reduced to iron. The reduction requires about 6 hours. The particles were immediately discharged while hot from the kiln into a 3 normal aqueous solution of ammonium hydroxide. The particles were then filtered out of the ammonium hydroxide solution and washed with acetone. The particles were then dried and were found to have a magnetic saturation moment of 125 emu/gram, a squareness ratio of 0.40 and a coercivity of 926 Oersteds.

I claim:

1. A process of stabilizing submicron iron particles comprising reducing an acicular submicron ferric oxide to substantially pure iron, contacting the reduced iron particles with an aqueous solution of ammonium hydroxide, recovering the iron particles from the ammonium hydroxide solution, washing the particles with an organic solvent and drying the particles.

2. The process of claim 1 wherein the ammonium hydroxide has a concentration of from 1 N to 20 N.

* * * * *